(12) United States Patent
Markoski et al.

(10) Patent No.: US 6,713,206 B2
(45) Date of Patent: Mar. 30, 2004

(54) ELECTROCHEMICAL CELLS COMPRISING LAMINAR FLOW INDUCED DYNAMIC CONDUCTING INTERFACES, ELECTRONIC DEVICES COMPRISING SUCH CELLS, AND METHODS EMPLOYING SAME

(75) Inventors: Larry J. Markoski, Champaign, IL (US); Jeffrey S. Moore, Savoy, IL (US); Joseph W. Lyding, Champaign, IL (US)

(73) Assignee: Board of Trustees of University of Illinois, Urbana, IL (US)

( * ) Notice: Subject to any disclaimer, the term of this patent is extended or adjusted under 35 U.S.C. 154(b) by 118 days.

(21) Appl. No.: 10/053,187

(22) Filed: Jan. 14, 2002

(65) Prior Publication Data

US 2003/0134163 A1 Jul. 17, 2003

(51) Int. Cl.[7] .................................................. H01M 2/14
(52) U.S. Cl. .............................. 429/38; 429/12; 429/13; 429/17
(58) Field of Search ............................ 429/12, 13, 17, 429/38

(56) References Cited

U.S. PATENT DOCUMENTS

| | | |
|---|---|---|
| 3,849,275 A | 11/1974 | Candor |
| 3,902,916 A | 9/1975 | Warszawski |
| 4,066,526 A | 1/1978 | Yeh |
| 4,311,594 A | 1/1982 | Perry |
| 4,652,504 A | 3/1987 | Ando |
| 4,732,823 A | 3/1988 | Ito et al. |
| 5,413,881 A | 5/1995 | Licht et al. |
| 5,534,120 A | 7/1996 | Ando et al. |
| 5,648,183 A | 7/1997 | Licht et al. |
| 5,858,567 A | 1/1999 | Spear, Jr. et al. |
| 5,863,671 A | 1/1999 | Spear, Jr. et al. |
| 5,952,118 A | 9/1999 | Ledjeff et al. |
| 2002/0028372 A1 | 3/2002 | Ohlsen et al. |
| 2002/0041991 A1 | 4/2002 | Chan et al. |

FOREIGN PATENT DOCUMENTS

WO     WO 01/37357     5/2001

OTHER PUBLICATIONS

D. J. Pickett et al., "Ionic Mass Transfer in Parallel Electrochemical Cells," J. Applied Electrochemistry, 2(2), 151–156 (1972).*
P. J. A. Kenis et al., "Microfabrication Inside Capillaries Using Multiphase Laminar Flow Patterning," Science, 285, 83–85 (1999).*
E. R. Choban et al., "Microflidic Fuel Cells That Lack a PEM," Proceedings of the Power Sources Conferece, 40th, 317–320 (2002).*
A. Heinzel and V.M. Barragan, "A review of the state–of–the–art of the methanol crossover in direct methanol fuel cells", Journal on Power Sources, 1999, 84 pp. 70–74.
Young Chan Kim, Kyung Won Ro, Nokyoung Park, and Jong Hoon Hahn, "Diffusion–Based Sample Cleanup Microchip For Protein Analysis By Electrospray Ionization Mass Spectrometry", 2 pages; abstract available online at http://pittcon.omnibooksonline.com/2001/papers/0226.pdf as of at least Jul. 24, 2001.

(List continued on next page.)

*Primary Examiner*—Carol Chaney
*Assistant Examiner*—Dah-Wei D. Yuan
(74) *Attorney, Agent, or Firm*—Sonnenschein Nath & Rosenthal LLP

(57) ABSTRACT

An electrochemical cell is described that includes (a) a first electrode; (b) a second electrode; and (c) a channel contiguous with at least a portion of the first and the second electrodes. When a first liquid is contacted with the first electrode, a second liquid is contacted with the second electrode, and the first and the second liquids flow through the channel, a parallel laminar flow is established between the first and the second liquids. Electronic devices containing such electrochemical cells and methods for their use are also described.

36 Claims, 12 Drawing Sheets-

OTHER PUBLICATIONS

Sharon Thomas and Marcia Zalbowtiz, *Fuel Cells: Green Power*, Los Alamos National Laboratory Monograph LA–UR–99–3231, 1999, pp. 1–33.

Bin Zhao, Jeffrey S. Moore, and David J. Beebe, "Surface–Directed Liquid Flow Inside Microchannels", *Science*, Feb. 9, 2001, vol. 291, pp. 1023–1026.

Paul J. A. Kenis, Rustem F. Ismagilov, and George M. Whitesides, "Microfabrication Inside Capillaries Using Multiphase Laminar Flow Patterning", *Science*, Jul. 2, 1999, vol. 285, pp. 83–85.

L. Carrette, K.A. Friedrich, and U. Stimming, "Fuel Cells–Fundamentals and Applications", *Fuel Cells 2001*, vol. 1, No. 1, pp. 5–39.

EG&G Services; Parsons, Inc.; and Science Applications International Corporation, *Fuel Cell Handbook, Fifth Edition*, Oct. 2000, U.S. Department of Energy, Office of Fossil Energy, National Energy Technology Laboratory, pp. i–xiii, 1–1 to 12–4.

Kyung Won Ro, Kwanseop Lim, Bong Chu Shim, Jin Ho Kim, and Jong Hoon Hahn, "Sample Celan–Up Using Multiphase Laminar Microfluidics for Electrospray Ionization Mass Spectrometry", 2 pages, abstract of Sep. 23–26, 2000 meeting available online at http://nanotech.osu.edu/abstracts/hahn.htm as of at least Jul. 24, 2001.

Larry K. Markoski, Summary of Knowledge About Laminar Flow Fuel Cells, 2002, 1 page.

\* cited by examiner

A) Laminar Flow

B) Turbulent Flow

A)

B)

a)

ELECTROCHEMICAL CELLS COMPRISING LAMINAR FLOW INDUCED DYNAMIC CONDUCTING INTERFACES, ELECTRONIC DEVICES COMPRISING SUCH CELLS, AND METHODS EMPLOYING SAME

BACKGROUND

This invention relates to the field of induced dynamic conducting interfaces. More particularly, this invention relates to laminar flow induced dynamic conducting interfaces for use in micro-fluidic batteries, fuel cells, and photoelectric cells.

A key component in many electrochemical cells is a semi-permeable membrane or salt bridge. One of the primary functions of these components is to physically isolate solutions or solids having different chemical potentials. For example, fuel cells generally contain a semi-permeable membrane (e.g., a polymer electrolyte membrane or PEM) that physically isolates the anode and cathode regions while allowing ions (e.g., hydrogen ions) to pass through the membrane. Unlike the ions, however, electrons generated at the anode cannot pass through this membrane, but instead travel around it by means of an external circuit. Typically, semi-permeable membranes are polymeric in nature and have finite life cycles due to their inherent chemical and thermal instabilities. Moreover, such membranes typically exhibit relatively poor mechanical properties at high temperatures and pressures, which seriously limits their range of use.

Fuel cell technology shows great promise as an alternative energy source for numerous applications. Several types of fuel cells have been constructed, including: polymer electrolyte membrane fuel cells, direct methanol fuel cells, alkaline fuel cells, phosphoric acid fuel cells, molten carbonate fuel cells, and solid oxide fuel cells. For a comparison of several fuel cell technologies, see Los Alamos National Laboratory monograph LA-UR-99-3231 entitled *Fuel Cells: Green Power* by Sharon Thomas and Marcia Zalbowitz, the entire contents of which are incorporated herein by reference, except that in the event of any inconsistent disclosure or definition from the present application, the disclosure or definition herein shall be deemed to prevail.

Although all fuel cells operate under similar principles, the physical components, chemistries, and operating temperatures of the cells vary greatly. For example, operating temperatures can vary from room temperature to about 1000° C. In mobile applications (for example, vehicular and/or portable microelectronic power sources), a fast-starting, low weight, and low cost fuel cell capable of high power density is required. To date, polymer electrolyte fuel cells (PEFCs) have been the system of choice for such applications because of their low operating temperatures (e.g., 60–120° C.), and inherent ability for fast start-ups.

FIG. 1 shows a cross-sectional schematic illustration of a polymer electrolyte fuel cell 2. PEFC 2 includes a high surface area anode 4 that acts as a conductor, an anode catalyst 6 (typically platinum alloy), a high surface area cathode 8 that acts as a conductor, a cathode catalyst 10 (typically platinum), and a polymer electrolyte membrane (PEM) 12 that serves as a solid electrolyte for the cell. The PEM 12 physically separates anode 4 and cathode 8. Fuel in the gas and/or liquid phase (typically hydrogen or an alcohol) is brought over the anode catalyst 6 where it is oxidized to produce protons and electrons in the case of hydrogen fuel, and protons, electrons, and carbon dioxide in the case of an alcohol fuel. The electrons flow through an external circuit 16 to the cathode 8 where air, oxygen, or an aqueous oxidant (e.g., peroxide) is being constantly fed. Protons produced at the anode 4 selectively diffuse through PEM 12 to cathode 8, where oxygen is reduced in the presence of protons and electrons at cathode catalyst 10 to produce water.

The PEM used in conventional PEFCs is typically composed of a perfluorinated polymer with sulphonic acid pendant groups, such as the material sold under the tradename NAFION by DuPont (Fayetteville, N.C.) (see: *Fuel Cell Handbook, Fifth Edition* by J. Hirschenhofer, D. Stauffer, R. Engleman, and M. Klett, 2000, Department of Energy—FETL, Morgantown, W. Va.; and L. Carrette, K. A. Friedrich, and U. Stimming in *Fuel Cells*, 2001, 1(1), 5). The PEM serves as catalyst support material, proton conductive layer, and physical barrier to limit mixing between the fuel and oxidant streams. Mixing of the two feeds would result in direct electron transfer and loss of efficiency since a mixed potential and/or thermal energy is generated as opposed to the desired electrical energy.

Operating the cells at low temperature does not always prove advantageous. For example, carbon monoxide (CO), which may be present as an impurity in the fuel or as the incomplete oxidation product of an alcohol, binds strongly to and "poisons" the platinum catalyst at temperatures below about 150° C. Therefore, CO levels in the fuel stream must be kept low or removed, or the fuel must be completely oxidized to carbon dioxide at the anode. Strategies have been employed either to remove the impurities (e.g., by an additional purification step) or to create CO-tolerant electrodes (e.g., platinum alloys). In view of the difficulties in safely storing and transporting hydrogen gas, the lower energy density per volume of hydrogen gas as compared to liquid-phase fuels, and the technological advances that have occurred in preparing CO-tolerant anodes, liquid fuels have become the phase of choice for mobile power sources.

Numerous liquid fuels are available. Notwithstanding, methanol has emerged as being of particular importance for use in fuel cell applications. FIG. 2 shows a cross-sectional schematic illustration of a direct methanol fuel cell (DMFC) 18. The electrochemical half reactions for a DMFC are as follows:

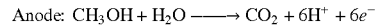
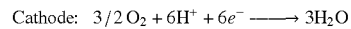
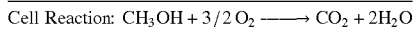

$$\text{Anode: } CH_3OH + H_2O \longrightarrow CO_2 + 6H^+ + 6e^-$$
$$\text{Cathode: } 3/2\,O_2 + 6H^+ + 6e^- \longrightarrow 3H_2O$$
$$\text{Cell Reaction: } CH_3OH + 3/2\,O_2 \longrightarrow CO_2 + 2H_2O$$

As shown in FIG. 2, the cell utilizes methanol fuel directly, and does not require a preliminary reformation step. DMFCs are of increasing interest for producing electrical energy in mobile power (low energy) applications. However, at present, several fundamental limitations have impeded the development and commercialization of DMFCs.

One of the major problems associated with DMFCs is that the semi-permeable membrane used to separate the fuel feed (i.e., methanol) from the oxidant feed (i.e., oxygen) is typically a polymer electrolyte membrane (PEM) of the type developed for use with gaseous hydrogen fuel feeds. These PEMs, in general, are not fully impermeable to methanol. As a result, an undesirable occurrence known as "methanol crossover" takes place, whereby methanol travels from the anode to the cathode through the membrane. In addition to being an inherent waste of fuel, methanol crossover also causes depolarization losses (mixed potential) at the cathode and, in general, leads to decreased cell performance.

Therefore, in order to fully realize the promising potential of DMFCs as commercially viable portable power sources, the problem of methanol crossover must be addressed. Moreover, other improvements are also needed including: increased cell efficiency, reduced manufacturing costs, increased cell lifetime, and reduced cell size/weight. In spite of massive research efforts, these problems persist and continue to inhibit the commercialization and development of DMFC technology.

A considerable amount of research has already been directed at solving the aforementioned problem of methanol crossover. Solutions have typically centered on attempts to increase the rate of methanol consumption at the anode, and attempts to decrease the rate of methanol diffusion to the cathode (see: A. Heinzel, and V. M. Barragan in *J. Power Sources,* 1999, 84, 70, and references therein). Strategies for increasing the rate of methanol consumption at the anode have included increasing catalyst loading (i.e., providing a larger surface area), increasing catalyst activity (i.e., increasing efficiency), and raising operating pressure and/or temperature. Strategies for decreasing the rate of methanol diffusion to the cathode have included decreasing methanol concentrations, fabricating thicker NAFION membranes, synthesizing new proton conducting materials having low permeability to methanol, lowering cell operating temperature, and fabricating methanol tolerant cathodes. However, to date, there remain pressing needs in DMFC technology for significantly lowered fabrication costs, increased efficiency, extended cell lifetimes, and appreciably reduced cell sizes/weights.

SUMMARY

The scope of the present invention is defined solely by the appended claims, and is not affected to any degree by the statements within this summary.

In a first aspect, the present invention provides an electrochemical cell that includes (a) a first electrode; (b) a second electrode; and (c) a channel contiguous with at least a portion of the first and the second electrodes; such that when a first liquid is contacted with the first electrode, a second liquid is contacted with the second electrode, and the first and the second liquids flow through the channel, a parallel laminar flow is established between the first and the second liquids, and a current density of at least 0.1 mA/cm$^2$ is produced.

In a second aspect, the present invention provides a device that includes an electrochemical cell as described above.

In a third aspect, the present invention provides a portable electronic device that includes an electrochemical cell as described above.

In a fourth aspect, the present invention provides a method of generating an electric current that includes operating an electrochemical cell as described above.

In a fifth aspect, the present invention provides a method of generating water that includes operating an electrochemical cell as described above.

In a sixth aspect, the present invention provides a method of generating electricity that includes flowing a first liquid and a second liquid through a channel in parallel laminar flow, wherein the first liquid is in contact with a first electrode and the second liquid is in contact with a second electrode, wherein complementary half cell reactions take place at the first and the second electrodes, respectively, and wherein a current density of at least 0.1 mA/cm$^2$ is produced.

In a seventh aspect, the present invention provides a fuel cell that includes a first electrode and a second electrode, wherein ions travel from the first electrode to the second electrode without traversing a membrane, and wherein a current density of at least 0.1 mA/cm$^2$ is produced.

In an eighth aspect, the present invention provides the improvement comprising replacing the membrane separating a first and a second electrode of a fuel cell with a parallel laminar flow of a first liquid containing a fuel in contact with the first electrode, and a second liquid containing an oxidant in contact with the second electrode, and providing each of the first liquid and the second liquid with a common electrolyte.

In a ninth aspect, the present invention provides an electrochemical cell that includes (a) a support having a surface; (b) a first electrode connected to the surface of the support; (c) a second electrode connected to the surface of the support and electrically coupled to the first electrode; (d) a spacer connected to the surface of the support, which spacer forms a partial enclosure around at least a portion of the first and the second electrodes; and (e) a microchannel contiguous with at least a portion of the first and the second electrodes, the microchannel being defined by the surface of the support and the spacer. When a first liquid is contacted with the first electrode, and a second liquid is contacted with the second electrode, a parallel laminar flow is established between the first and the second liquids, and a current density of at least 0.1 mA/cm$^2$ is produced.

The presently preferred embodiments described herein may possess one or more advantages relative to other devices and methods, which can include but are but not limited to: reduced cost; increased cell lifetime; reduced internal resistance of the cell; reduction or elimination of methanol crossover or fouling of the cathode; ability to recycle left-over methanol that crosses over into the oxidant stream back into the fuel stream; ability to increase reaction kinetics proportionally with temperature and/or pressure without compromising the integrity of a membrane; and ability to fabricate a highly efficient, inexpensive, and lightweight cell.

DETAILED DESCRIPTION OF THE PRESENTLY PREFERRED EMBODIMENTS

Figure 1:
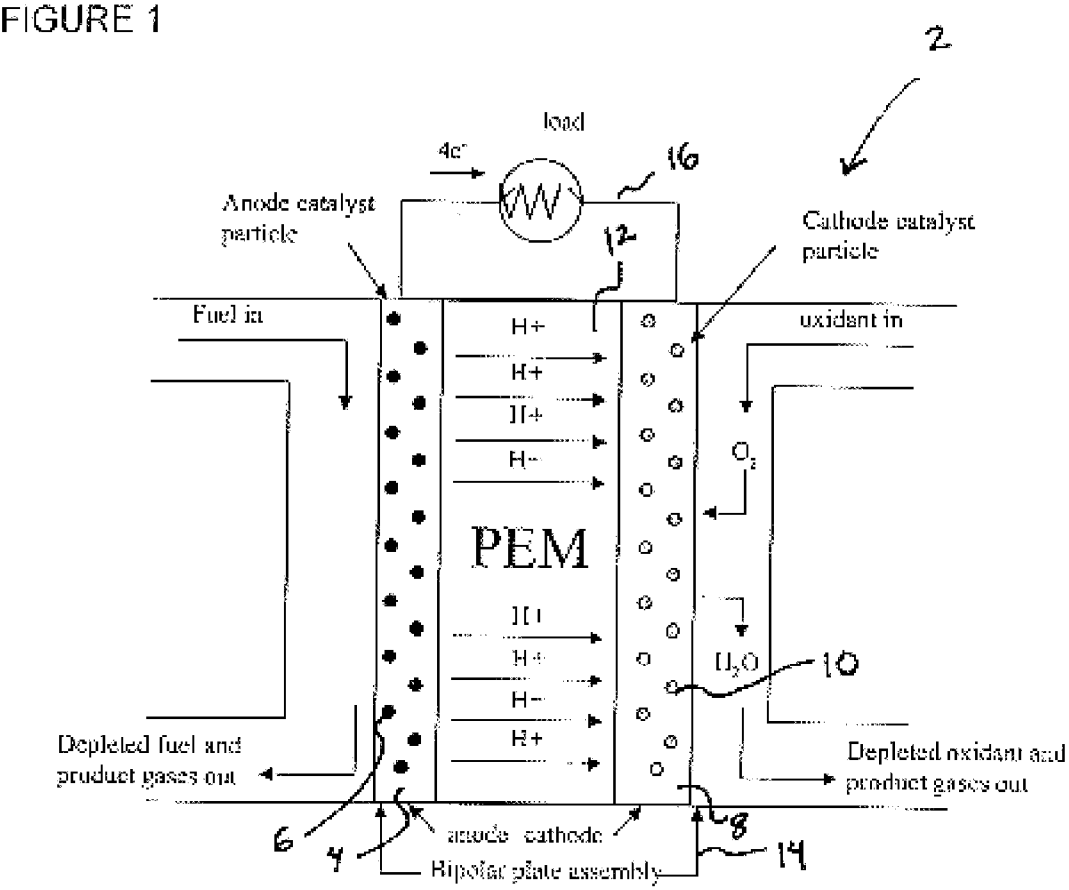
FIG. 1 shows a cross-sectional schematic illustration of a polymer electrolyte fuel cell.
Figure 2:
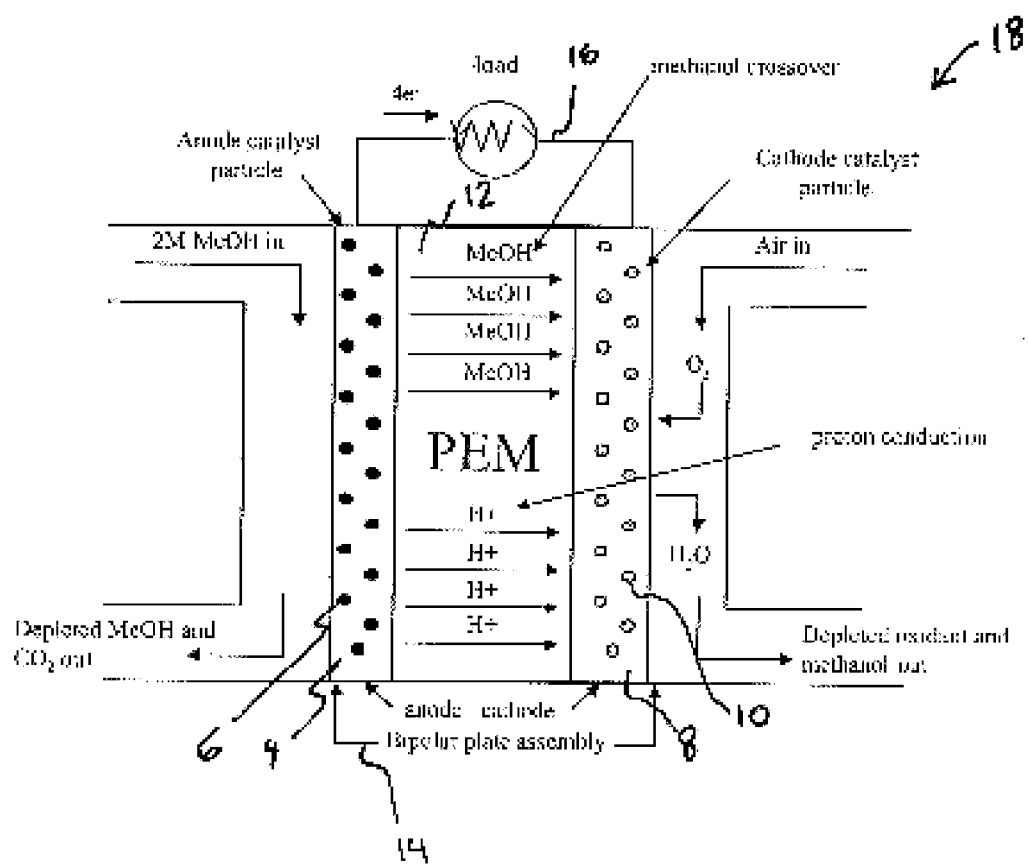
FIG. 2 shows a cross-sectional schematic illustration of a direct methanol fuel cell.

A revolutionary paradigm in cell design, which solves many of the problems described above, has been discovered wherein the use of a PEM has been eliminated entirely. An electrochemical cell in accordance with the present invention does not require a membrane, and is therefore not constrained by the limitations inherent in conventional membranes. Instead, a mechanism has been developed by which ions can travel from one electrode to another without traversing a membrane, and which allows proton conduction while preventing mixing of the fuel and oxidant streams. This mechanism, described more fully hereinbelow, involves establishing laminar flow induced dynamic conducting interfaces.

Throughout this description and in the appended claims, the phrase "electrochemical cell" is to be understood in the very general sense of any seat of electromotive force (as defined in *Fundamentals of Physics, Extended Third Edition* by David Halliday and Robert Resnick, John Wiley & Sons, New York, 1988, 662 ff.). The phrase "electrochemical cell" refers to both galvanic (i.e., voltaic) cells and electrolytic cells, and subsumes the definitions of batteries, fuel cells, photocells (photovoltaic cells), thermopiles, electric generators, electrostatic generators, solar cells, and the like. In addition, throughout this description and in the appended claims, the phrase "complementary half cell reactions" is to be understood in the very general sense of oxidation and reduction reactions occurring in an electrochemical cell.

Ideally, the structural components of a DMFC will have the following characteristics. Preferably, the membrane should (1) be resistant to harsh oxidizing/reducing environments; (2) possess mechanical toughness; (3) be resistant to high temperatures and pressures (e.g., 0–160° C. and 1–10 atm); (4) be impermeable to methanol under all operating conditions; (5) conduct protons with minimal ohmic resistance and mass transport losses; and (6) be composed of lightweight and inexpensive materials. Both the anode and cathode, preferably, should (1) exhibit high catalytic activity; (2) possess a large surface area; (3) require minimal amounts of precious metals; and (4) be easily to fabricated. In addition, the anode should preferably show tolerance to carbon monoxide, and the cathode should preferably show tolerance to methanol if so needed. The integrated fuel cell assembly itself should preferably (1) have few moving parts; (2) require no external cooling system; (3) require no fuel reformer or purifier; (4) be composed of durable and inexpensive components; (5) be easily fabricated; (6) be easily integrated into fuel cell stacks; and (7) provide highly efficient energy conversion (i.e., at least 50%).

Heretofore, there has been no single fuel cell design that successfully incorporates all of the aforementioned attributes. However, it has now been discovered that by completely eliminating the PEM from the DMFC, and by redesigning the system to function on the microfluidic scale, one or more of these attributes can be achieved. In the absence of a PEM, a mechanism to allow proton conduction while preventing mixing of the fuel and oxidant streams is needed. Such a mechanism, described more fully hereinbelow, can be established in microfluidic flow channels through a phenomenon known as "parallel laminar flow," whereby two liquid streams flow side-by-side in physical contact (thereby enabling proton conduction), without mixing and in the complete absence of a physical barrier or membrane. The two liquids can be miscible or immiscible. Obviation of a physical membrane for stream segregation and proton transport from a fuel cell significantly decreases manufacturing costs and increases the efficiency and versatility of the cell.

Figure 3:
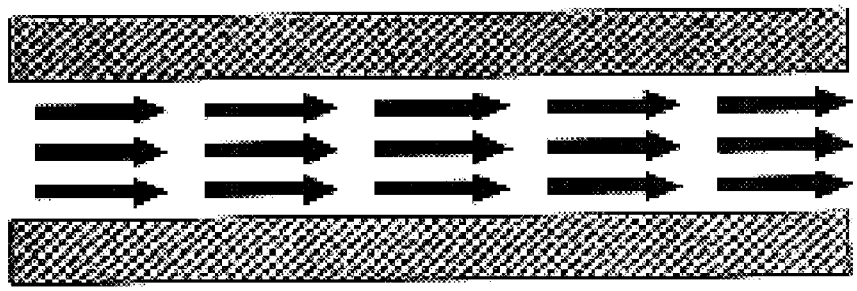
FIG. 3 shows a schematic illustration of modes of fluid flow.
Figure 3:
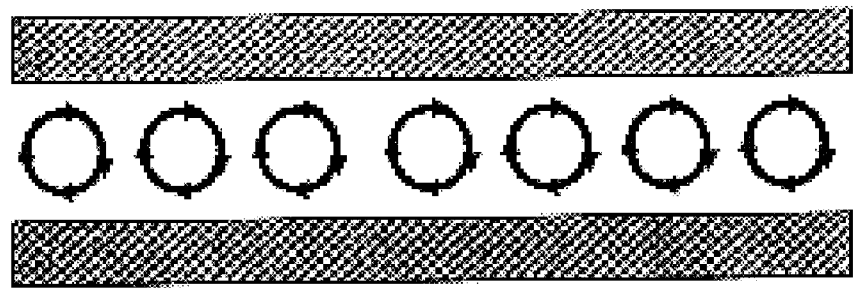

As shown in FIG. 3, fluid flow can be categorized into two regimes: laminar flow and turbulent flow. In steady or laminar flow (FIG. 3A), the velocity of the fluid at a given point does not change with time (i.e., there are well-defined stream lines). In turbulent flow (FIG. 3B), the velocity of the fluid at a given point does change with time. While both laminar and turbulent flow occur in natural systems (e.g., in the circulatory system), turbulent flow generally predominates on the macroscale. In contrast, laminar flow is generally the norm on the microfluidic scale.

An indicator of the relative turbulence of a flow stream for a fluid under flow can be expressed as a dimensionless quantity known as the Reynolds number ($R_e$). The Reynolds number is defined as the ratio of inertial forces to viscous forces, and can be expressed as:

$$R_e = \rho L/\mu$$

where L is the characteristic length in meters, $\rho$ is the density of the fluid in grams/cm$^3$, v is the linear velocity in meters/sec, and $\mu$ is the viscosity of the fluid in grams/(sec)(cm).

Figure 4:
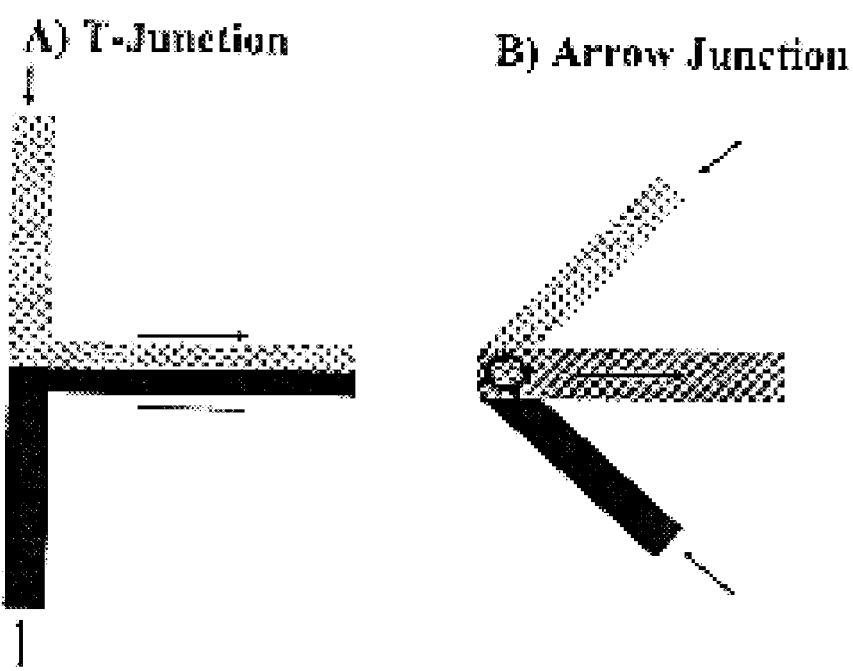
FIG. 4 shows a schematic illustration of the relationship between input stream geometry and mode of fluid flow.

There is a transitional critical value of $R_e$ for any given geometry above which flow is said to be turbulent and below which flow is said to be laminar. For typical fluidic devices, the transition from laminar to turbulent flow has been empirically determined to occur around $R_e=2,300$. Formulae to calculate $R_e$ for specific geometries are well known (see: *Micromachined Transducers: Sourcebook* by G. T. A. Kovacs, McGraw-Hill, Boston, 1998). In some microchannel geometries, flow is strictly laminar, complicating the mixing of two miscible streams. However, as shown in FIG. 4, the geometry of the input streams can greatly affect turbulence and mixing. A T-junction (FIG. 4A) brings two miscible streams together in a laminar flow, which is maintained without turbulent mixing. In contrast, introducing the two streams in an arrow-type junction (FIG. 4B) produces turbulent flow and subsequent mixing.

Figure 5:
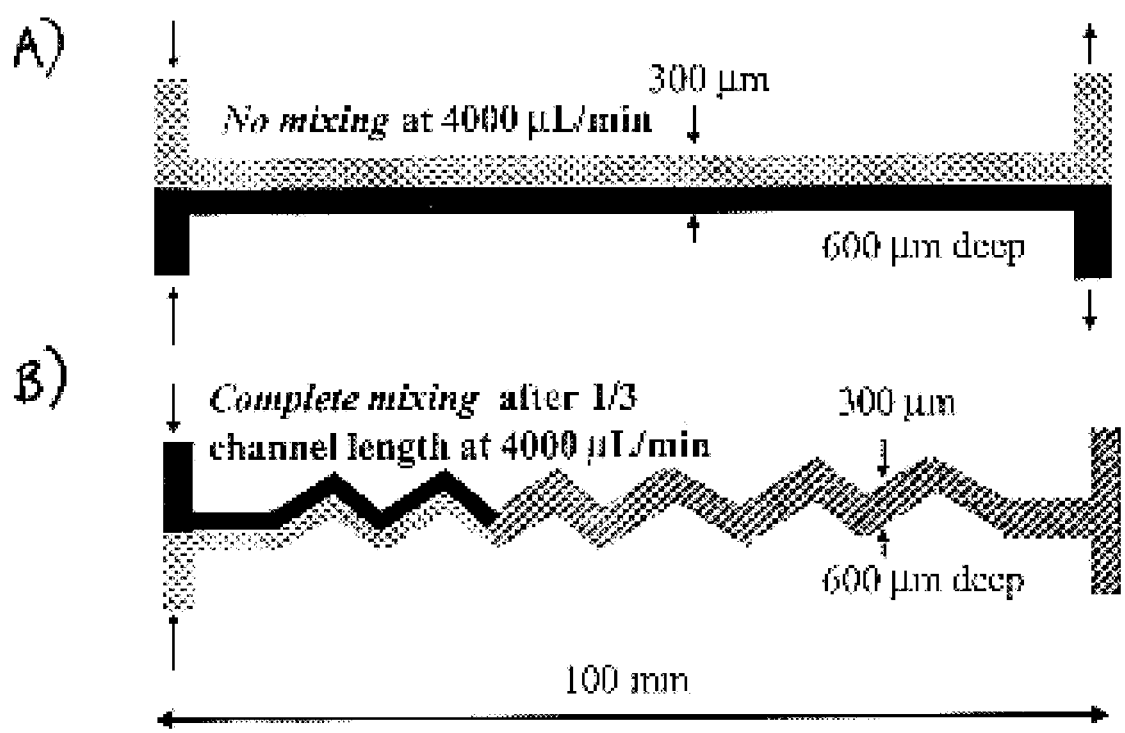
FIG. 5 shows a schematic illustration of the relationship between microfluidic flow channel geometry and mode of fluid flow.

In addition to the influence of input stream geometry on the mode of fluid flow, the geometry of the microfluidic channel also has an effect. The mixing efficiencies of various channel shapes have been investigated, as shown in FIG. 5 (see: J. Branebjerg, B. Fabius, and P. Gravesen, "Application of Miniature Analyzers from Microfluidic Components to $\mu$TAS," in *Proceedings of Micro Total Analysis Systems Conference, Twente, Netherlands, Nov. 21–22, 1994*, edited by A. van den Berg and P. Bergveld, pp 141–151). Brothymol Blue (yellowish) was injected into one of the input ports and NaOH into the other. Mixing could be observed by the formation of a dark blue product. Results indicated that turbulent flow was caused by sharp corners, which resulted in full mixing by the time the fluid had traversed about one third of the zigzag pattern channel (FIG. 5B). However, since the only mode of mixing possible for the straight channel was diffusion, no mixing was observed at the same flow rate (FIG. 5A).

Geometry is not the only variable that affects the degree of mixing. The residence time, or flow rates of solutions can have an impact as well. The average time for a particle to diffuse a given distance depends on the square of that distance. A diffusion time scale ($T_d$) can be expressed as $$T_d = L^2/D$$

where L is the relevant mixing length in micrometers and D is the diffusion coefficient. The rate of diffusion for a given molecule is typically determined by its size. A table of diffusion coefficients for some common molecules is shown below in Table 1 (see: J. P. Brody, and P. Yager, "Diffusion-Based Extraction in a Microfabricated Device," *Sensors and Actuators*, January, 1997, A58, no. 1, pp. 13–18). As may be seen from this Table, the proton ($H^+$) has the highest diffusion coefficient in water at room temperature.

TABLE 1

| Water Soluble Molecule | Molecular Weight (AMU) | Diffusion Coefficient In Water at Room Temp ($\mu m^2/sec$) |
| --- | --- | --- |
| $H^+$ | 1 | 9,000 |
| $Na^+$ | 23 | 2,000 |
| $O_2$ | 32 | 1,000 |
| Glycine | 75 | 1,000 |
| Hemoglobin | $6 \times 10^4$ | 70 |
| Myosin | $4 \times 10^5$ | 10 |
| Tobacco Mosaic Virus | $4 \times 10^7$ | 5 |

Figure 6:
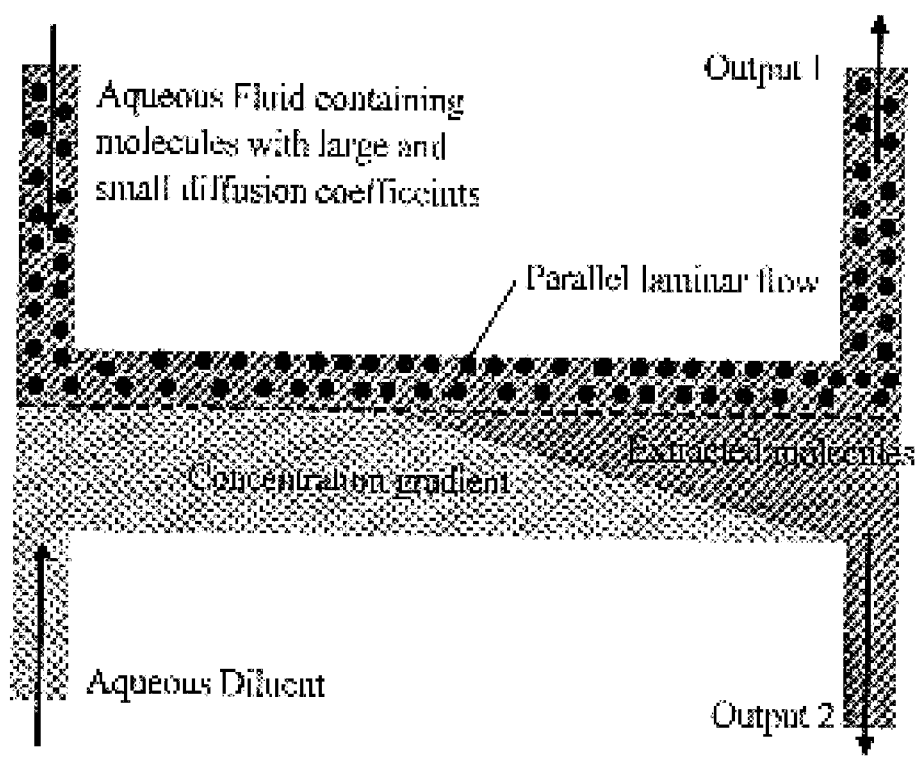
FIG. 6 shows a schematic illustration of a diffusion-based micro-extractor.

When two fluids with differing concentrations or compositions of molecules are forced to flow parallel to one another in a single channel, extraction of molecules can be accomplished on the basis of diffusion coefficient differences. For example, as shown in FIG. 6, $Na^+$ can be extracted from blood plasma by controlling channel dimension, flow rate, and the dwell time the two streams are in contact, thus producing a continuous micro-extractor (see: Brody reference, vide supra).

It has been discovered that parallel laminar flow between two miscible streams of liquid induces an ultra-thin dynamic conducting ("semi-permeable") interface (hereinafter "induced dynamic conducting interface" or "IDCI"), which wholly replaces the PEMs or salt bridges of conventional devices. The IDCI can maintain concentration gradients over considerable flow distances and residence times depending on the dissolved species and the dimensions of the flow channel.

An electrochemical cell embodying features of the present invention includes (a) a first electrode; (b) a second electrode; and (c) a channel contiguous with at least a portion of the first and the second electrodes. When a first liquid is contacted with the first electrode, a second liquid is contacted with the second electrode, and the first and the second liquids flow through the channel, a parallel laminar flow is established between the first and the second liquids, and a current density of at least 0.1 $mA/cm^2$ is produced.

Figure 7:
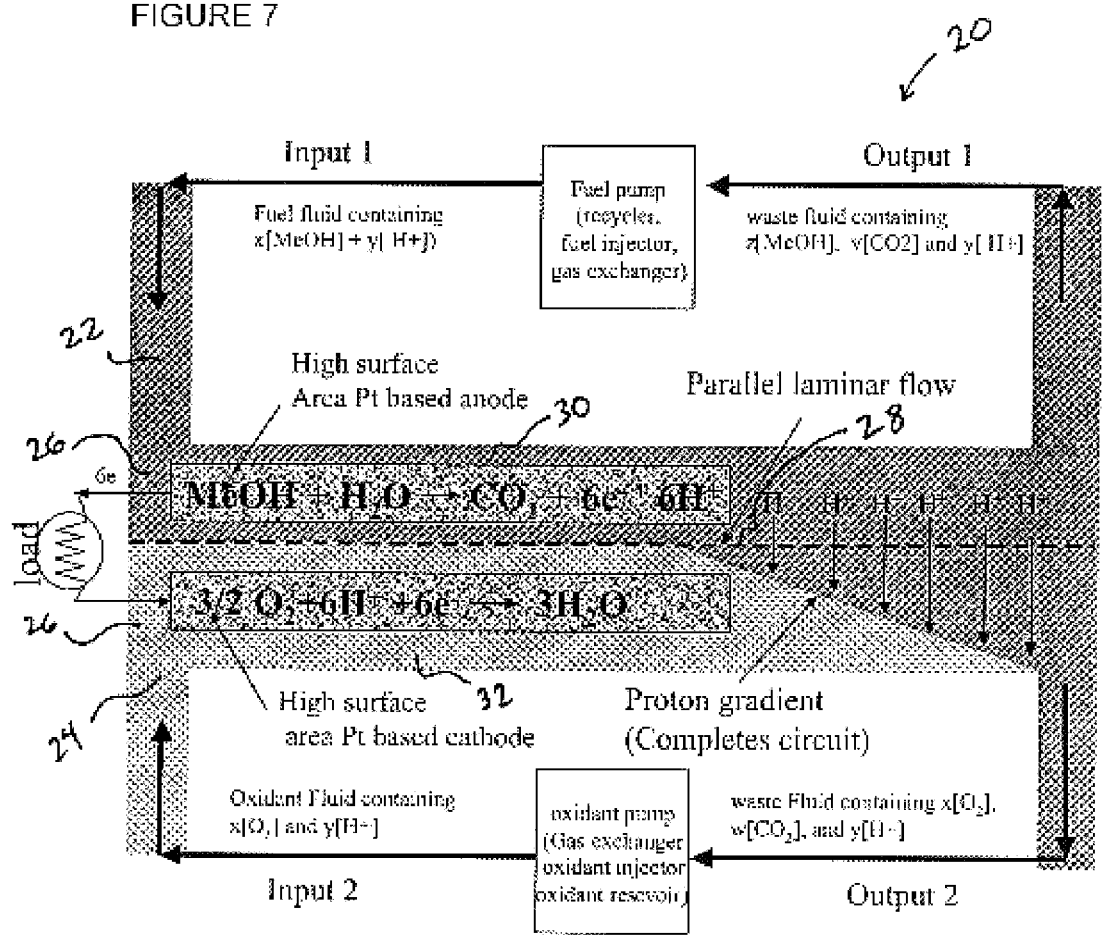
FIG. 7 shows a schematic illustration of a direct methanol fuel cell containing a laminar flow induced dynamic interface.

Flow cell designs embodying features of the present invention introduce a new paradigm for electrochemical cells in general, and for fuel cells—especially DMFCs—in particular. A fuel cell 20 embodying features of the present invention that does not require a PEM nor is subject to several of the limitations imposed by conventional PEMs is shown in FIG. 7. In this design, both the fuel input 22 (e.g. an aqueous solution containing MeOH and a proton source) and the oxidant input 24 (e.g., a solution containing dissolved oxygen or hydrogen peroxide and a proton source) are in liquid form. By pumping the two solutions into the microchannel 26, parallel laminar flow induces a dynamic proton conducting interface 28 that is maintained during fluid flow. If the flow rates of the two fluids are kept constant and the electrodes are properly deposited on the bottom and/or top surfaces of the channel, the IDCI is established between anode 30 and cathode 32.

A proton gradient is created between the two streams and rapid proton diffusion completes the circuit of the cell as protons are produced at anode 30 and consumed at cathode 32. In this case, the IDCI prevents the two solutions from mixing and allows rapid proton conduction by diffusion to complete the circuit.

Preferably, the liquid containing the fuel and the liquid containing the oxidant each contains a common electrolyte, which is preferably a source of protons (e.g., a Brønsted acid). A portion of these externally provided protons may be consumed in the half-cell reaction occurring at the cathode. Thus, a reliance on pure diffusion for conveying protons from the fuel stream to the oxidant stream can be avoided and current densities of at least 0.1 $mA/cm^2$ can be achieved.

Preferably, an electrochemical cell embodying features of the present invention produces current densities of at least 0.1 $mA/cm^2$, more preferably of at least 1 $mA/cm^2$, still more preferably of at least 2 $mA/cm^2$. A current density of 27 $mA/cm^2$ has been produced in accordance with presently preferred embodiments. Although there is presently no preferred limit to the amount of current density produced by an electrochemical cell embodying features of the present invention, it is preferred that the current density produced by a cell be substantially matched to the requirements for a particular application. For example, if an electrochemical cell embodying features of the present invention is to be utilized in a cellular phone requiring a current density of about 10 $mA/cm^2$, it is preferred that the electrochemical cell produce a current density that is at least sufficient to match this demand.

Advantages of the design shown in FIG. 7 include but are not limited to the following: reduced cost due to the elimination of a PEM; increased cell lifetime due to the continual regeneration of the IDCI, which neither wears out nor fails under flow; reduced internal resistance of the cell due to the infinite thinness of the IDCI; reduction or elimination of methanol crossover or fouling of the cathode since, with proper design, diffusion occurs only downstream of the cathode; ability to recycle back into the fuel stream left-over methanol that crosses over into the oxidant stream; ability to increase reaction kinetics proportionally with temperature and/or pressure without compromising the integrity of the IDCI; ability to fabricate a highly efficient, inexpensive, and lightweight cell through optimization of cell dimensions, flow rate, fuel (concentration and composition), oxidant (concentration and composition) and electrodes (surface area, activity, and chemical composition).

In an optimized cell design, the methanol is completely consumed before it diffuses into the oxidant stream. This is feasible if the concentration of methanol is controlled by a methanol sensor coupled to a fuel injector or to a flow rate monitor. Alternatively, a water immiscible oxidant fluid stream having a very low affinity for methanol and a high affinity for oxygen and carbon dioxide can be used in conjunction with the laminar flow-type cell shown in FIG. 7. At least one such family of fluids (viz., perfluorinated fluids such as perfluorodecalin available from F2 Chemicals Ltd., Preston, UK) has been successfully used in respiration-type fluids for medicinal applications. These fluids exhibit an extremely high affinity for oxygen and extremely low affinities for methanol and water. They are chemically inert and thermally stable. When these fluids are doped with NAFION or an alternative proton source, they become proton conducting. Thus, inasmuch as methanol is soluble in the aqueous fuel stream only, the unwanted problem of methanol crossover into the water immiscible oxidant fluid stream is reduced or eliminated. Moreover, since both liquids are excellent heat exchangers, an external cooling system is not required.

Figure 8:
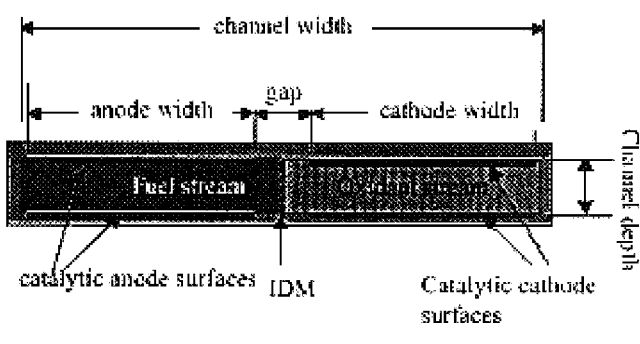
FIG. 8 shows a schematic illustration of side-by-side and face-to-face microfluidic channel configurations.
Figure 8:
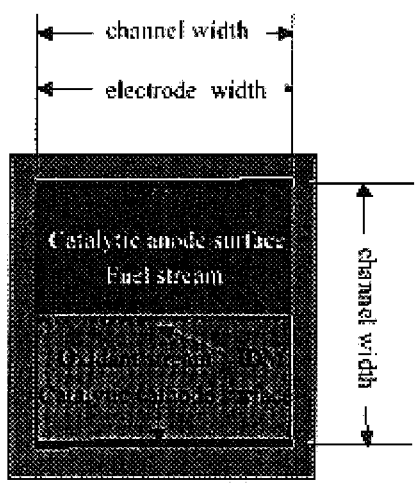

Cell and electrode dimensions and electrode placement affect cell efficiency. FIG. 8 shows two alternative cell designs. In FIG. 8A, the anode and cathode are positioned side-by-side, analogous to the placement shown in FIG. 7. In FIG. 8B, the anode and cathode are positioned face-to-face. The optimization of cell dimensions can be achieved via computer modeling (e.g., using fluid flow modeling programs, Microsoft EXCEL software, etc.) to correlate optimum laminar flow conditions (i.e., minimum mixing) with easily fabricated channel dimensions and geometries. Critical values for the Reynolds number can be calculated for an array of cell designs with respect to channel width, depth, length, flow rate, and interfacial surface area. In this manner, a channel design that provides the greatest power output and highest fuel conversion can be determined.

When appropriate electrode dimensions and placement of electrodes have been determined as set forth above, the electrodes are then patterned onto a support (e.g., a soda lime or pyrex glass slide). The electrodes may be sacrificial electrodes (i.e., consumed during the operation of the electrochemical cell) or non-sacrificial electrodes (i.e., not consumed by the operation of the electrochemical cell). In preferred embodiments, the electrodes are non-sacrificial. In any event, the type of electrode used in accordance with the present invention is not limited. Any conductor with bound catalysts that either oxidize or reduce methanol or oxygen are preferred. Suitable electrodes include but are not limited to carbon electrodes, platinum electrodes, palladium electrodes, gold electrodes, conducting polymers, metals, ceramics, and the like.

The electrode patterns can be produced by spray coating a glass slide and mask combination with dispersions of metallic (preferably platinum) particles in an organic or aqueous carrier. A preferred dispersion of platinum particles in an organic carrier is the inexpensive paint product sold under the tradename LIQUID BRIGHT PLATINUM by Wale Apparatus (Hellertown, Pa.). The patterned slide is then baked in a high temperature oven in the presence of oxygen or air to produce a thin conductive layer of pure platinum. This technique enables production of thin, high surface area, mechanically robust, low resistance, platinum electrodes on glass slides. To increase the carbon monoxide tolerance of these electrodes, they can be decorated with ruthenium using chemical vapor deposition, sputtering, or a technique known as spontaneous electroless deposition (see: A. Wieckowski et al. *J. Catalysis,* 2001, in press).

Figure 9:
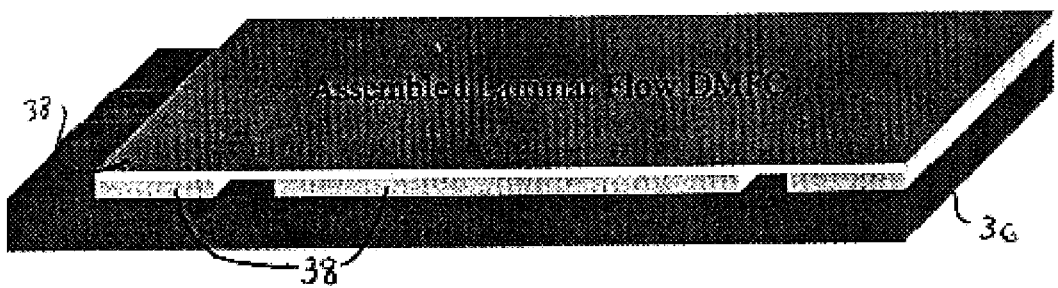
FIG. 9 shows a perspective view of a laminar flow fuel cell in accordance with the present invention.
Figure 10:
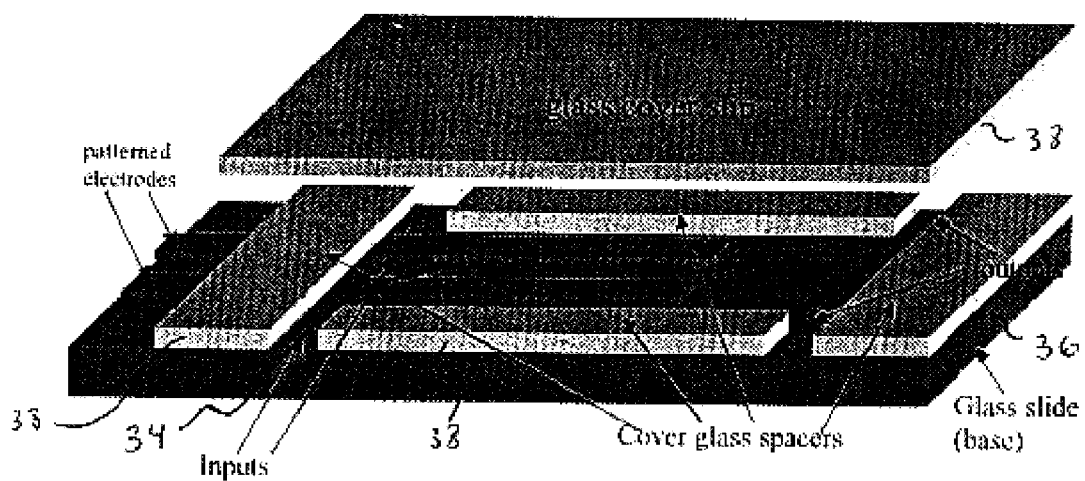
FIG. 10 shows an exploded perspective view of the fuel cell shown in FIG. 9.

Once the electrodes have been patterned on a support, the microchannel can be constructed readily from flat, inexpensive, precision starting materials as shown in FIGS. 9–10 using techniques such as those described by B. Zhao, J. S. Moore, and D. J. Beebe in *Science,* 2001, 291, 1023–1026. Microchannel 34 can be constructed from commercially available glass slides 36 and cover slips 38. The microchannel 34 can be sealed with an ultraviolet-based chemically resistant adhesive. A preferred ultraviolet-based chemically resistant adhesive is that sold by Norland Products, Inc. (Cranberry, N.J.), which is chemically resistant to most water-miscible solvents. The cell thus produced will have chemical resistance and can be employed as a single channel laminar flow DMFC.

Once a single channel laminar flow DMFC has been assembled, optimization experiments can be performed in which the efficiency of the cell is evaluated with respect to concentration of methanol, concentration of proton, oxidant composition, flow rate, and temperature. Evaluation of cell performance is determined based on cell potential, current density, peak power, and power output. The single channel laminar flow DMFC is reusable, and multiple experiments can be performed with the same cell.

The fuel and oxidant are introduced into the flow channel with the aid of one or more pumps, preferably with the aid of one or more high-pressure liquid chromatography (HPLC) fluid pumps. For example, the flow rate of the fuel and oxidant streams can be controlled with two HPLC pumps to enable precise variation of the flow rate from 0.01 to 10 mL/min. This approach allows for the use of large reservoirs of fuel and oxidant that can be heated to constant temperatures and maintained under inert atmosphere, air, or oxygen, as needed. The effluent streams can be monitored for the presence of methanol to quantify chemical conversion, cell efficiency, and methanol crossover, by sampling the effluent stream and subjecting it to gas chromatographic analysis. In this manner, the optimized operating conditions for a single channel laminar flow DMFC can be determined.

It is noted that the fabrication technique described above can be readily extended to the construction of multi-channel laminar flow DMFC stacks for use in devices having increased power requirements. Likewise, the methods described above for optimizing and quantifying the efficiency of single channel laminar flow DMFCs can be used to optimize and quantify the efficiency of arrayed multi-channel cell designs. The electrodes in such multi-channel cell designs can be connected in both series and parallel configurations to investigate the parameters of maximum cell voltage and current.

A single channel laminar flow DMFC can be constructed using materials with sufficient structural integrity to withstand high temperatures and/or pressures. Graphite composite materials (similar to those used in DMFCs from Manhattan Scientific) or ceramic materials (similar to those used in DMFCs from Los Alamos National Laboratory) can be used in view of their light weight, mechanical integrity, high temperature stability, corrosion resistance, and low cost. In addition, a variety of fabrication techniques can be used to produce the microchannel including micro-milling, micro-molding, and utilizing an Electric Discharge Machine (EDM) such as is used in the fabrication of injection molds. The electrodes can be deposited as described above, and a chemically inert gasket used to seal the cell. The gasket can be made, for example, from a fluoropolymer such as polytetrafluoroethylene sold under the tradename TEFLON by DuPont (Wilmington, Del.). Alternative sealing techniques such as those utilized by Manhattan Scientifics can also be employed. Optimization and quantification of the efficiency of these single channel laminar flow DMFCs can be achieved using the techniques described above.

Although the manner of establishing and utilizing an induced dynamic conducting interface in accordance with the present invention has been described primarily in reference to a DMFC, it is emphatically noted that the concepts and principles described herein are general to all manner of electrochemical cells, including but not limited to other types of fuel cells and to batteries, photocells, and the like.

The manner in which a device embodying features of the present invention is made, and the process by which such a device is used, will be abundantly clear to one of ordinary skill in the art based upon joint consideration of both the preceding description, and the following representative procedures. It is to be understood that many variations in the presently preferred embodiments illustrated herein will be obvious to one of ordinary skill in the art, and remain within the scope of the appended claims and their equivalents.

EXAMPLES

A Laminar Flow Cell Using Sacrificial Electrodes

Figure 11:
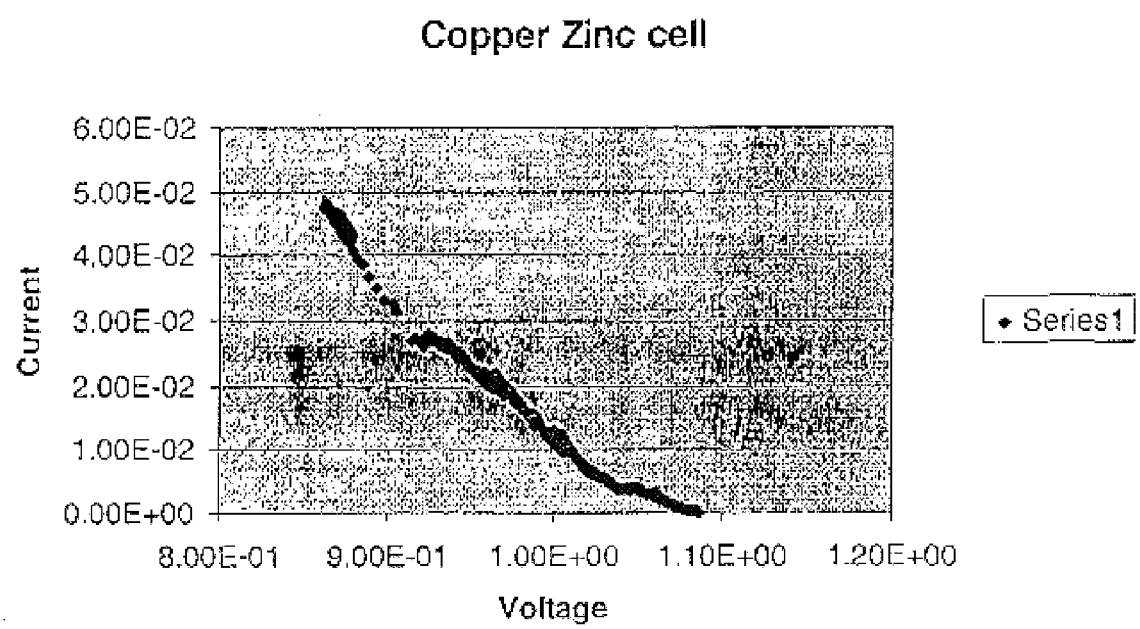
FIG. 11 shows a plot of current vs. voltage for a copper-zinc laminar flow fuel cell.

Flat copper and zinc electrodes (ca. 0.125×20×3 mm) were imbedded into a block of polycarbonate by micro-machining channels and adhering the electrodes into these channels to create a flat surface. The electrodes were both of equivalent size and ran parallel to each other with a gap of approximately 5 mm therebetween. On top of this electrode assembly was assembled a flow channel composed of microscope coverglass as shown in FIG. 11. The cell was sealed with UV glue (Norland Products Inc., Cranberry, N.J.) and the input adapters were secured with commercially available epoxy (Loctite Quick Set Epoxy, Rocky Hill, Conn.). Once the cell was assembled, aqueous solutions of 2M copper sulphate and zinc sulphate were prepared. The zinc sulphate solution was brought into the channel first over the zinc electrode with the aid of a syringe pump (this filled the entire channel with liquid and care was take to remove all air bubbles). The copper sulphate solution was then introduced over the copper electrode. Laminar flow was established between the electrodes and a current to voltage plot was developed as shown in FIG. 11. The flow rates of the two solutions were held constant and equal to each other (e.g., at 0.1 mL/min) in order for the induced dynamic conducting interface to exist between the two electrodes. If the flow rates were different and the opposing stream touched the opposite electrode, the cell would short and produce no current. Thus, in accordance with the present invention, it is preferred that the flow rates of the two solutions be similar (i.e., differ by less than about 15 percent, more preferably by less than about 10 percent, and still more preferably by less than about 5 percent).

A Laminar Flow Cell Using Non-Sacrificial Electrodes

Figure 12:
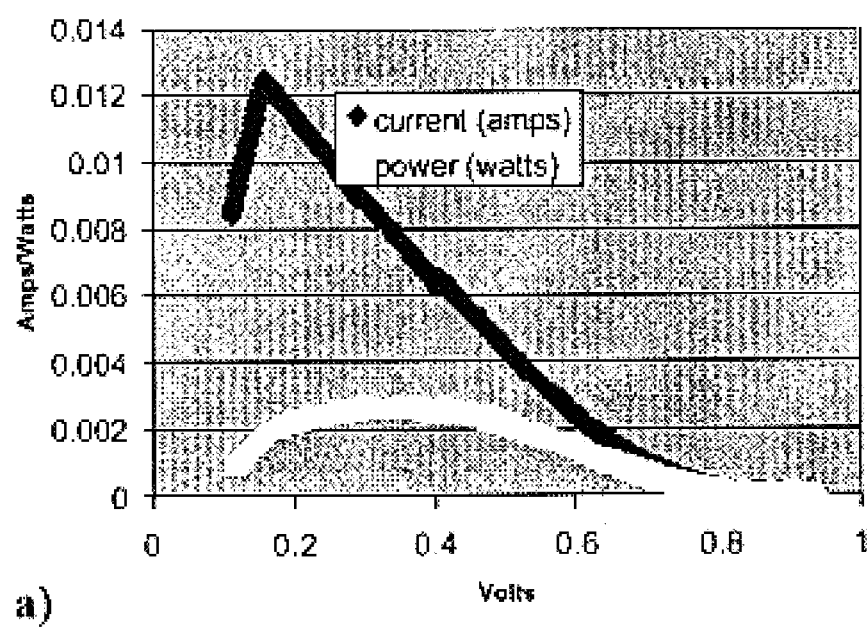
FIG. 12 shows a plot of current vs. voltage for a platinum-platinum laminar flow fuel cell.

Two flat platinum electrodes (ca. 0.125×20×3 mm) were imbedded into a block of polycarbonate by micro-machining channels and adhering the electrodes into these channels, creating a flat substrate with exposed electrode surfaces. The electrodes were both of equivalent size and ran parallel to each other with a gap of approximately 5 mm. On top of this electrode assembly was assembled a flow channel composed of double stick tape and a microscope coverglass as shown in FIG. 11. The cell was sealed and the input adapters were secured with commercially available epoxy (Loctite Quick Set Epoxy, Rocky Hill, Conn.). Next, solutions of iron (II) chloride in 10% $H_2SO_4$ (0.6M) and potassium permanganate in 10% $H_2SO_4$ (0.076M) were prepared. The iron solution was brought into the channel first over the platinum electrodes with the aid of a syringe pump (this filled the entire channel with liquid and care was take to remove all air bubbles). The permanganate solution was then introduced and laminar flow was visibly established between the electrodes. The flow rates of the two solutions were held constant and equal to each other in order for the induced dynamic conducting interface to exist between the two electrodes. Current flow (I) and cell potential (V) were measured with the aid of a variable resistor and potentiometer. A current to voltage plot was then developed as shown in FIG. 12, thus confirming the functioning of the device as an electrochemical cell. The flow rate was held at 0.05 mL/min and the reproducibility was good. The power plot for this data can also be seen in FIG. 12. The electrochemical half reactions for the cell are as follows:

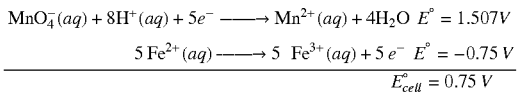

$$MnO_4^-(aq) + 8H^+(aq) + 5e^- \longrightarrow Mn^{2+}(aq) + 4H_2O \quad E° = 1.507V$$
$$5\,Fe^{2+}(aq) \longrightarrow 5\,Fe^{3+}(aq) + 5\,e^- \quad E° = -0.75\,V$$
$$E°_{cell} = 0.75\,V$$

This particular chemistry was chosen to demonstrate the feasibility of a reaction in which all products and reactants remained in solution and utilized a common electrolyte. Since the electrodes are not involved in the reaction, their lifetimes are very long and the cell will continue to operate as long as oxidant and reductant are provided. The IDCI has an infinite lifetime because it is constantly being regenerated under flow. With this particular reaction, the dark purple permanganate solution becomes colorless at the cathode under high current conditions providing a visible means of measuring current flow. Should the effluent stream be purple, it indicates that oxidant has not been completely consumed. The color change occurs only at the cathode surface (not at the interface), further indicating true laminar flow with ion conductivity. This technology can be transferred directly to applications involving DMFCs.

The laminar flow induced dynamic conducting interface technology described herein is applicable to numerous cells systems including but not limited to batteries, fuel cells, and photoelectric cells. It is contemplated that this technology will be especially useful in portable and mobile fuel cell systems, such as in cellular phones, laptop computers, DVD players, televisions, palm pilots, calculators, pagers, handheld video games, remote controls, tape cassettes, CD players, AM and FM radios, audio recorders, video recorders, cameras, digital cameras, navigation systems, wristwatches, and the like. It is also contemplated that this technology will also be useful in automotive and aviation systems, including systems used in aerospace vehicles and the like.

Throughout this description and in the appended claims, it is to be understood that elements referred to in the singular (e.g., a microchannel, a fuel cell, a spacer, a fuel input, an oxidant input, and the like), refer to one or a plurality of such elements, regardless of the tense employed.

Obviously, numerous modifications and variations of the present invention are possible in light of the above teachings. It is therefore to be understood that within the scope of the appended claims, the invention may be practiced otherwise than as specifically described herein.

What is claimed is:

1. An electrochemical cell comprising:
    a first electrode
    a second electrode; and
    a channel contiguous with at least a portion of the first and the second electrodes;
    such that when a first liquid is contacted with the first electrode, a second liquid is contacted with the second electrode, and the first and the second liquids flow through the channel, a parallel laminar flow is established between the first and the second liquids, and a current density of at least 0.1 mA/cm² is produced.

2. The electrochemical cell of claim 1 wherein the channel comprises a first input adjacent to the first electrode, and a second input adjacent to the second electrode.

3. The electrochemical cell of claim 2 wherein the first liquid is introduced through the first input, and the second liquid is introduced through the second input.

4. The electrochemical cell of claim 3 wherein the first liquid is introduced through the first input using a first pump, and the second liquid is introduced through the second input using a second pump.

5. The electrochemical cell of claim 3 wherein the first liquid is introduced through the first input at a first flow rate, the second liquid is introduced through the second input at a second flow rate, and the first flow rate and the second flow rate are similar.

6. The electrochemical cell of claim 2 wherein the channel further comprises a first outlet adjacent to the first electrode and a second outlet adjacent to the second electrode.

7. The electrochemical cell of claim 2 wherein the first input and the second input are configured such that a first liquid introduced through the first input and a second liquid introduced through the second input will be in physical contact along an interface in parallel laminar flow.

8. The electrochemical cell of claim 7 wherein the support comprises polycarbonate.

9. The electrochemical cell of claim 7 wherein the support comprises a glass slide.

10. The electrochemical cell of claim 1 wherein the first liquid comprises methanol and the second liquid comprises oxygen.

11. The electrochemical cell of claim 1 wherein a proton gradient is established along at least a portion of an interface between the first liquid and the second liquid.

12. The electrochemical cell of claim 11 wherein a diffusion of protons from the first electrode to the second electrode occurs primarily downstream of the second electrode.

13. The electrochemical cell of claim 1 wherein the first liquid comprises methanol and the second liquid comprises hydrogen peroxide.

14. The electrochemical cell of claim 1 wherein the channel has a substantially straight flow channel geometry.

15. The electrochemical cell of claim 1 further comprising a support having a surface with first and second recessed portions, wherein the first and the second electrodes occupy the first and second recessed portions, respectively, such that an upper surface of the first electrode and an upper surface of the second electrode are planar with the surface of the support.

16. The electrochemical cell of claim 1 wherein the first liquid and the second liquid are miscible.

17. The electrochemical cell of claim 1 wherein the first liquid and the second liquid are immiscible.

18. The electrochemical cell of claim 1 wherein the first electrode and the second electrode are spray-coated on a support.

19. The electrochemical cell of claim 1 wherein each of the first electrode and the second electrode comprises platinum.

20. The electrochemical cell of claim 19 wherein at least one of the first electrode and the second electrode comprises ruthenium.

21. The electrochemical cell of claim 1 wherein the first and the second electrodes are electrically coupled.

22. The electrochemical cell of claim 1 wherein the first liquid comprises a fuel and the second liquid comprises an oxidant.

23. The electrochemical cell of claim 1 wherein the first liquid comprises a fuel whose concentration is controlled by a fuel sensor coupled to a device selected from the group consisting of a fuel injector, a flow rate monitor, a fuel recycler, a gas exchanger, and combinations thereof.

24. The electrochemical cell of claim 23 wherein the fuel comprises methanol and the fuel sensor comprises a methanol sensor.

25. The electrochemical cell of claim 1 wherein the second liquid comprises an oxidant and is mechanically coupled to a device selected from the group consisting of a gas exchanger, an oxidant injector, an oxidant reservoir, and combinations thereof.

26. The electrochemical cell of claim 1 wherein the first electrode comprises an anode and the second electrode comprises a cathode.

27. The electrochemical cell of claim 1 wherein the cell constitutes a fuel cell.

28. The electrochemical cell of claim 27 wherein the fuel cell comprises a direct methanol fuel cell.

29. A device comprising the electrochemical cell of claim 1.

30. A portable electronic device comprising the electrochemical cell of claim 1.

31. A method of generating an electric current comprising operating the electrochemical cell of claim 1.

32. A method of generating water comprising operating the electrochemical cell of claim 1.

33. A method of generating electricity comprising:
flowing a first liquid and a second liquid through a channel in parallel laminar flow, wherein the first liquid is in contact with a first electrode and the second liquid is in contact with a second electrode, wherein complementary half cell reactions take place at the first and the second electrodes, respectively, and wherein a current density of at least 0.1 $mA/cm^2$ is produced.

34. A fuel cell comprising a first electrode and a second electrode, wherein ions travel from the first electrode to the second electrode without traversing a membrane, and wherein a current density of at least 0.1 $mA/cm^2$ is produced.

35. In a fuel cell comprising a first liquid containing a fuel in contact with a first electrode, a second liquid containing an oxidant in contact with a second electrode, and a membrane separating the first and the second electrodes, the improvement comprising replacing the membrane with a parallel laminar flow of the first and the second liquids, and providing each of the first liquid and the second liquid with a common electrolyte.

36. An electrochemical cell comprising:
a support having a surface;
a first electrode connected to the surface of the support;
a second electrode connected to the surface of the support and electrically coupled to the first electrode;
a spacer connected to the surface of the support, which spacer forms a partial enclosure around at least a portion of the first and the second electrodes; and
a microchannel contiguous with at least a portion of the first and the second electrodes, the microchannel being defined by the surface of the support and the spacer;
such that when a first liquid is contacted with the first electrode, and a second liquid is contacted with the second electrode, a parallel laminar flow is established between the first and the second liquids, and a current density of at least 0.1 $mA/cm^2$ is produced.

* * * * *

UNITED STATES PATENT AND TRADEMARK OFFICE
CERTIFICATE OF CORRECTION

| | | |
|---|---|---|
| PATENT NO. | : 6,713,206 B2 | Page 1 of 1 |
| APPLICATION NO. | : 10/053187 | |
| DATED | : March 30, 2004 | |
| INVENTOR(S) | : Larry J. Markoski, Jeffrey S. Moore and Joseph W. Lyding | |

It is certified that error appears in the above-identified patent and that said Letters Patent is hereby corrected as shown below:

On title page (item 56)

Under Foreign Patent Documents please list:

JP 10-211447A           08/1998
JP 4-284889             10/1992

Signed and Sealed this

Twenty-ninth Day of August, 2006

JON W. DUDAS
*Director of the United States Patent and Trademark Office*